(12) United States Patent
Fu et al.

(10) Patent No.: US 10,121,359 B2
(45) Date of Patent: Nov. 6, 2018

(54) METHODS AND DEVICES FOR PROMPTING INFORMATION OF A SMART SOCKET

(71) Applicant: Beijing Xiaomi Mobile Software Co., Ltd., Haidian Street, Beijing (CN)

(72) Inventors: Qiang Fu, Beijing (CN); Hao Chen, Beijing (CN); Enxing Hou, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 1 day.

(21) Appl. No.: 15/394,335

(22) Filed: Dec. 29, 2016

(65) Prior Publication Data

US 2017/0345284 A1    Nov. 30, 2017

(30) Foreign Application Priority Data

May 31, 2016    (CN) .......................... 2016 1 0379227

(51) Int. Cl.
*G08B 17/06*    (2006.01)
*G08B 25/10*    (2006.01)
(Continued)

(52) U.S. Cl.
CPC .......... *G08B 25/10* (2013.01); *G08B 21/182* (2013.01); *G08B 25/08* (2013.01);
(Continued)

(58) Field of Classification Search
CPC ... G08B 25/10; G08B 21/182; H04L 12/2825; H04L 2012/2841; H04M 1/72569
(Continued)

(56) References Cited

U.S. PATENT DOCUMENTS 7,513,683 B2    4/2009    Sanderford et al.
2008/0084216 A1    4/2008    Sanderford et al.
(Continued)

FOREIGN PATENT DOCUMENTS

CN    202231253 U    5/2012
CN    202888541 U    4/2013
(Continued)

OTHER PUBLICATIONS

Notification of the First Office Action of Chinese and English translation for application No. 201610379227.0 , dated Aug. 14, 2017; 15 pages.
(Continued)

*Primary Examiner* — Tanmay Shah
(74) *Attorney, Agent, or Firm* — Arch & Lake LLP

(57) ABSTRACT

Methods and devices are provided for prompting information. The method includes: temperature in a smart socket is acquired; the temperature in the smart socket is compared with a preset temperature threshold value, and it is determined whether power of electric equipment connected with the smart socket is higher than an upper limit of an acceptable power range of the smart socket according to a comparison result; when the power of the electric equipment is determined to be higher than the upper limit of the acceptable power range of the smart socket, alarming information indicating that the power of the electric equipment is excessively high is generated; and the alarming information is pushed to a mobile terminal bound with the smart socket.

17 Claims, 6 Drawing Sheets

(51) Int. Cl.
*G08B 21/18* (2006.01)
*H04L 12/28* (2006.01)
*H04M 1/725* (2006.01)
*H01R 13/713* (2006.01)
*G08B 25/08* (2006.01)
*H02J 3/14* (2006.01)

(52) U.S. Cl.
CPC ..... *H01R 13/7137* (2013.01); *H04L 12/2825* (2013.01); *H04M 1/72569* (2013.01); *H02J 3/14* (2013.01); *H04L 2012/2841* (2013.01)

(58) Field of Classification Search
USPC ........................................................ 340/593
See application file for complete search history.

(56) References Cited

U.S. PATENT DOCUMENTS

| | | | |
|---|---|---|---|
| 2009/0167537 A1 | 7/2009 | Feliss et al. | |
| 2012/0089263 A1* | 4/2012 | Park | H02J 13/001 700/291 |
| 2012/0150359 A1* | 6/2012 | Westergaard | H02J 3/14 700/291 |
| 2014/0248802 A1 | 9/2014 | Hieda | |
| 2017/0070090 A1* | 3/2017 | Miller | H02J 13/0079 |
| 2017/0155526 A1* | 6/2017 | Li | H01R 13/6675 |

FOREIGN PATENT DOCUMENTS

| | | |
|---|---|---|
| CN | 103441385 A | 12/2013 |
| CN | 103996936 A | 8/2014 |
| CN | 204011992 U | 12/2014 |
| CN | 204597141 U | 8/2015 |
| CN | 105186227 A | 12/2015 |
| CN | 204927711 U | 12/2015 |
| CN | 105356169 A | 2/2016 |
| EP | 2744070 A1 | 6/2014 |
| JP | 2002027604 A | 1/2002 |
| TW | 200415827 A | 8/2004 |
| WO | 2015174019 A1 | 11/2015 |

OTHER PUBLICATIONS

International Search Report issued in corresponding International Application No. PCT/CN2016/091860, dated Mar. 8, 2017, 11 pages.

The Written Opinion of the International Search Authority issued in corresponding International Application No. PCT/CN2016/091860, dated Mar. 8, 2017, 3 pages.

Supplementary European Search Report in connection with corresponding EP Application No. 17173280.3, dated Oct. 11, 2017, 9 pages.

\* cited by examiner

METHODS AND DEVICES FOR PROMPTING INFORMATION OF A SMART SOCKET

CROSS-REFERENCE TO RELATED APPLICATION

This application is filed based upon and claims priority to Chinese Patent Application No. 201610379227.0, filed on May 31, 2016, the entire contents of which are incorporated herein by reference.

TECHNICAL FIELD

The present disclosure generally relates to the technical field of communications, and more particularly, to methods and devices for prompting information from smart home equipment.

BACKGROUND

Along with continuous development of electronic technologies, smart home equipment emerges, and smart home equipment is increasingly applied to people's daily lives and work, and brings more and more convenience to people's lives. Particularly, smart sockets are widely applied. Smart sockets usually refer to sockets with built-in Wireless Fidelity (WI-FI) modules and capable of being remotely controlled to switch on and off through clients installed on mobile terminals, and a user may control switching-on/off of a smart socket through a mobile client.

However, when electric equipment with excessive power is plugged into a smart socket for work, although the electric equipment may be powered through the smart socket to work normally, it is dangerous, and service life of the smart service is shortened.

SUMMARY

According to a first aspect of the present disclosure, there is provided an information prompting method, which may include that: temperature in a smart socket is acquired; the temperature in the smart socket is compared with a preset temperature threshold value, and it is determined whether power of electric equipment connected with the smart socket is higher than an upper limit of an acceptable power range of the smart socket according to a comparison result; when the power of the electric equipment is determined to be higher than the upper limit of the acceptable power range of the smart socket, alarming information indicating that the power of the electric equipment is excessively high is generated; and the alarming information is pushed to a mobile terminal bound with the smart socket.

According to a second aspect of the present disclosure, there is provided an information prompting device, including: a processor; and a memory for storing instructions executable by the processor. The processor may be configured to: acquire temperature in a smart socket; compare the temperature in the smart socket with a preset temperature threshold value, and determine whether power of electric equipment connected with the smart socket is higher than an upper limit of an acceptable power range of the smart socket according to a comparison result; when the power of the electric equipment is determined to be higher than the upper limit of the acceptable power range of the smart socket, generate alarming information indicating that the power of the electric equipment is excessively high; and push the alarming information to a mobile terminal bound with the smart socket.

According to a third aspect of the disclosure, there is provided a non-transitory computer-readable storage medium having stored therein instructions that, when executed by a processor, causes the processor to perform an information prompting acts including: acquiring temperature in a smart socket; the temperature in the smart socket is compared with a preset temperature threshold value, and it is determined whether power of electric equipment connected with the smart socket is higher than an upper limit of an acceptable power range of the smart socket according to a comparison result; when the power of the electric equipment is determined to be higher than the upper limit of the acceptable power range of the smart socket, alarming information indicating that the power of the electric equipment is excessively high is generated; and the alarming information is pushed to a mobile terminal bound with the smart socket.

It is to be understood that the above general descriptions and detailed descriptions below are only exemplary and explanatory and not intended to limit the present disclosure.

BRIEF DESCRIPTION OF THE DRAWINGS

The accompanying drawings, which are incorporated in and constitute a part of this specification, illustrate embodiments consistent with the present disclosure and, together with the specification, serve to explain the principles of the present disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of devices and methods consistent with some aspects related to the present disclosure as recited in the appended claims.

Terms adopted in the present disclosure are intended not to limit the present disclosure but only to describe specific embodiments. "a," "said," and "the" adopted in the present disclosure and the appended claims and indicating a singular form are also intended to include a plural form unless their meanings are clearly expressed in the context. It should also be understood that term "and/or" adopted in the present disclosure refers to inclusion of any or all possible combinations of one or more associated items which are listed.

It should be understood that terms first, second, third and the like may be adopted to describe various kinds of information in the present disclosure but these information may not be limited to these terms. These terms are only adopted to distinguish the same type of information. For example, without departing from the scope of the present disclosure, first information may also be called second information, and similarly, second information may also be called first information. This depends on the context, and for example, term "if" adopted here may be explained as "at the time of" or "when" or "in response to determination."

Smart home equipment is more and more applied to people's daily lives, and taking a smart socket as an example, a user may control switching-on/off of the smart socket through a mobile terminal, herein the mobile terminal involved in the present disclosure may be a smart mobile phone, a tablet computer, a Personal Digital Assistant (PDA), an E-book reader, a multimedia player, a smart band, smart eyeglasses and the like.

Figure 1A:
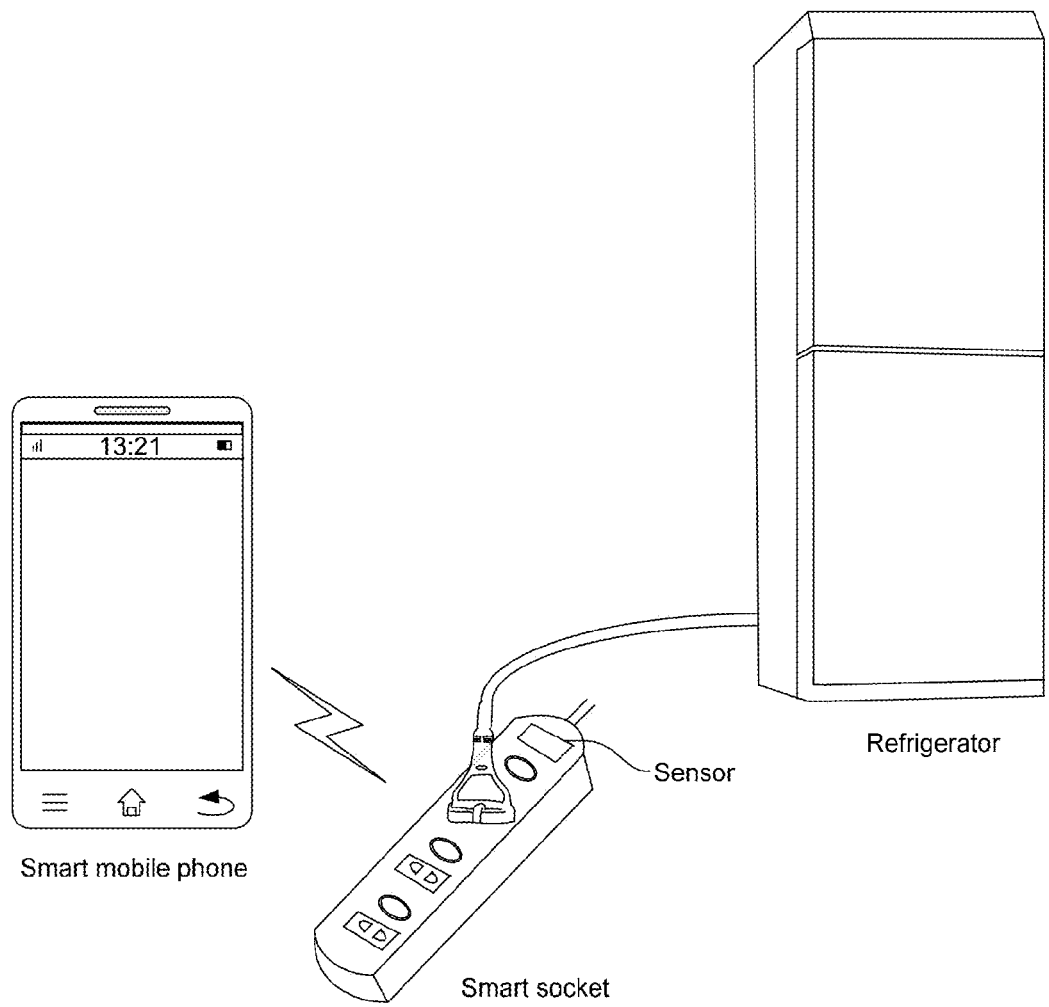
FIG. 1A is an application scenario diagram of an information prompting method according to an exemplary embodiment of the present disclosure.

The mobile terminal may directly control the smart socket. For example, the smart socket provides an access point and the mobile terminal searches for the access point and is connected with the smart socket. In another example, the mobile terminal provides an access point and the smart socket searches for the access point and is connected with the mobile terminal. FIG. 1A illustrates an example application scenario diagram of an information prompting method, according to one or more embodiments of the present disclosure. For example, in the application scenario, the mobile terminal is a smart mobile phone and electric equipment is a refrigerator. The smart socket provides an access point, the smart mobile phone searches for the access point and is connected with the smart socket, and the smart mobile phone sends a switching control instruction to control switching-on/off of the smart socket.

Figure 1B:
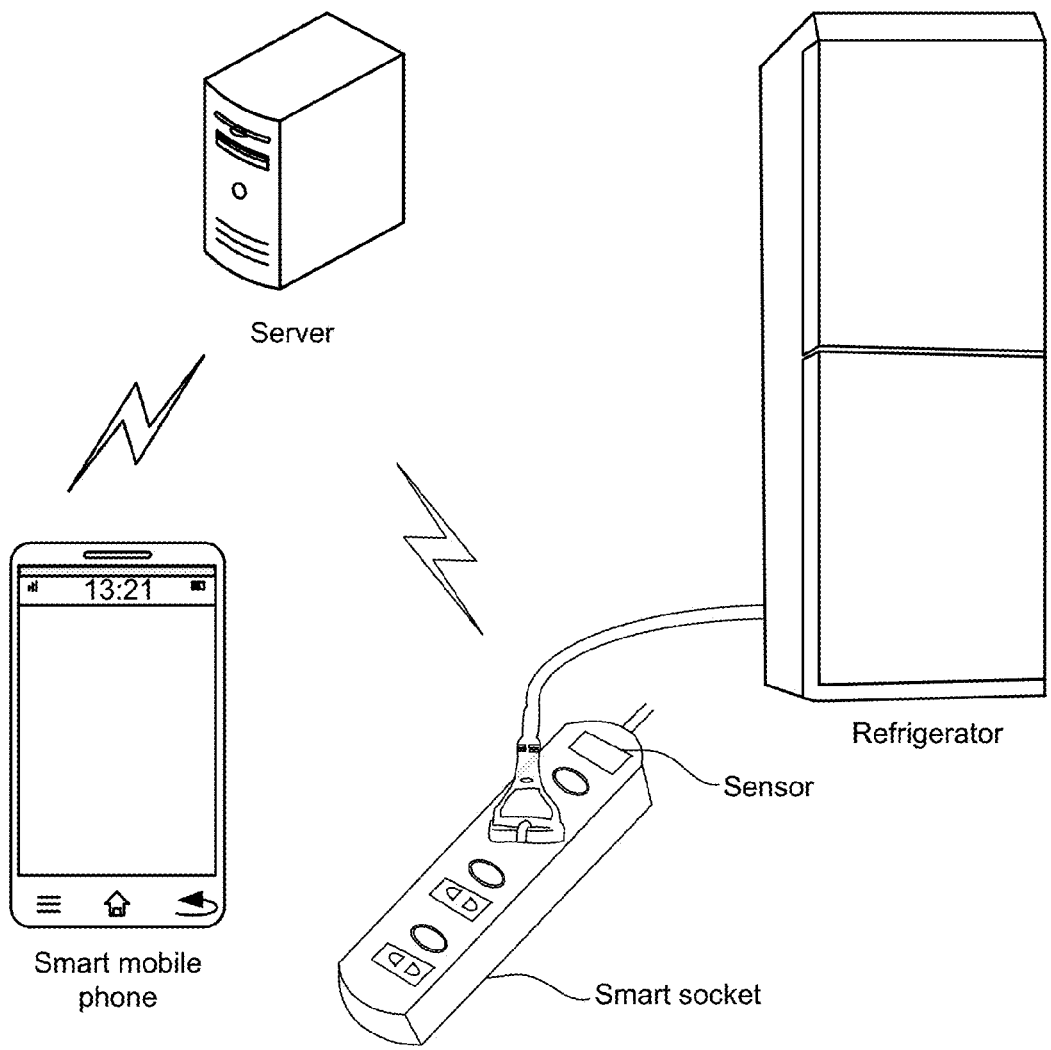
FIG. 1B is an application scenario diagram of another information prompting method according to an exemplary embodiment of the present disclosure.

The mobile terminal may also remotely control the smart socket through a server and a router, the mobile terminal transmits a control instruction to the server, and the server transmits the instruction to the smart socket. As shown in FIG. 1B, FIG. 1B is an application scenario diagram of another information prompting method, according to an exemplary embodiment of the present disclosure. For example, in the application scenario, the mobile terminal is a smart mobile phone and the electric equipment is a refrigerator. The smart socket may include at least one processor and a sensor that is accessible to the processor, where the processor may be a micro-controller. The sensor may obtain temperature of the smart socket. The sensor may be arranged on a circuit board of the smart socket, and may also be arranged on an inner shell and the like of the smart socket.

Based on the abovementioned application scenarios, the present disclosure provides an information prompting method, which may be applied to the server in the application scenario. The server acquires temperature in the smart socket, generates alarming information indicating that power of the electric equipment is excessively high when determining that the power of the electric equipment is higher than an upper limit of an acceptable power range of the smart socket according to the temperature, and pushes the alarming information to the mobile terminal bound with the smart socket. The information prompting method may also be applied to the smart socket in the application scenarios, and the smart socket acquires the temperature detected by a temperature sensor, generates alarming information indicating that the power of the electric equipment is excessively high when determining that the power of the electric equipment is higher than the upper limit of the acceptable power range of the smart socket according to the temperature, and directly pushes the alarming information to the mobile terminal bound with the smart socket, or uploads the alarming information to the server for the server to push to the mobile terminal bound with the smart socket. Further, the disclosed information prompting method may be implemented partially in the server and partially in the smart socket. The information prompting method provided by the present disclosure will be introduced below.

Figure 2:
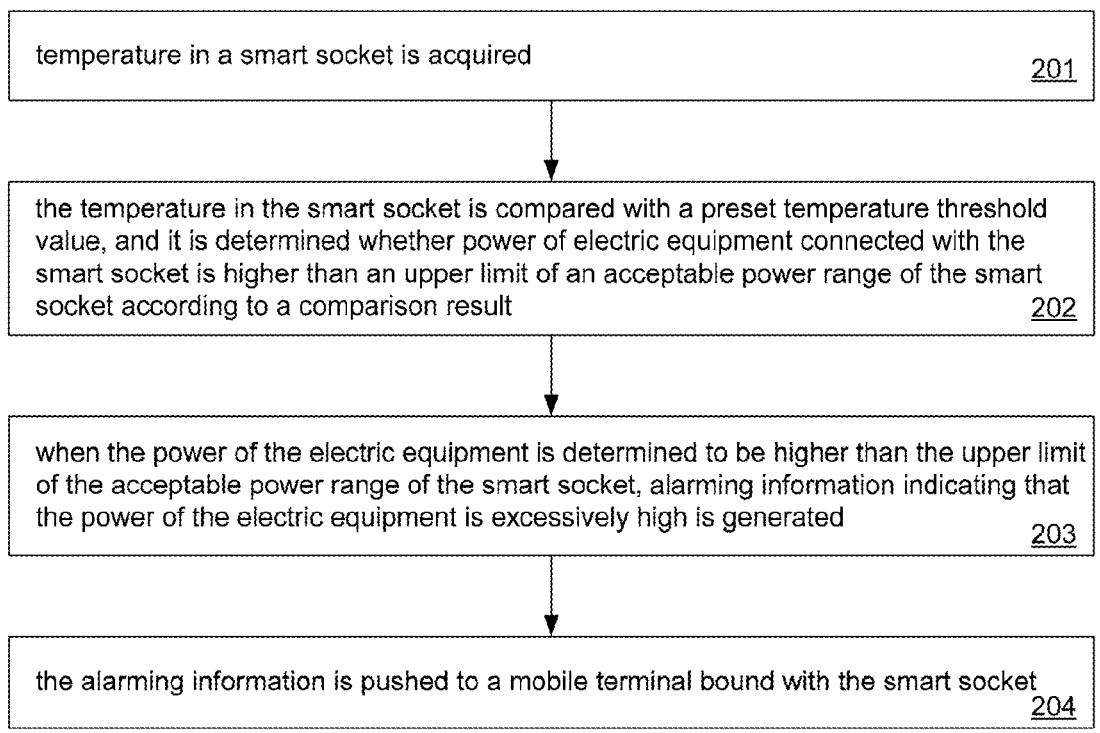
FIG. 2 is a flow chart showing an information prompting method according to an exemplary embodiment of the present disclosure.

FIG. 2 is a flow chart showing an information prompting method, according to an exemplary embodiment of the present disclosure, and as shown in FIG. 2, the method includes the following Step 201 to Step 204. The method may be at least partially implemented by a smart socket, which includes a micro-controller and a temperature sensor.

Step 201: temperature in a smart socket is acquired. For example, the temperature may be measured by the sensor first and then transmitted to the micro-controller of the smart socket.

For time to acquire the temperature in the smart socket, the temperature in the smart socket may be acquired in real time, and the temperature in the smart socket may also be acquired when a preset temperature acquisition condition is met. The preset temperature acquisition condition may be that set time is reached, may also be that a time interval is reached, and may further be that the smart socket is at an on position and the like.

Acquiring the temperature in the smart socket when the smart socket is at the on position may avoid resource waste caused by real-time acquisition and avoid untimely acquisition caused by regular acquisition.

Furthermore, since electric equipment connected with the smart socket may be in a working state and may also be in a non-working state when the smart socket is at the on position and the temperature in the smart socket is usually not so high when the electric equipment is in the non-working state, the temperature may not be required to be detected.

On such a basis, the temperature in the smart socket during working of the electric equipment may be acquired in Step 201, and the electric equipment is connected with the smart socket. Here, only acquiring the temperature in the smart socket during working of the electric equipment may avoid resource waste caused by acquisition and comparison.

One way to determine whether the electric equipment is in the working state is by detecting the temperature range of the connected smart socket. For example, the electric equipment may be determined to be in the working state and the temperature in the smart socket may be acquired when a control instruction, sent by a mobile terminal, of starting the electric equipment is detected in a scenario where the mobile terminal is bound with the electric equipment. Here, in the scenario where the mobile terminal is bound with the electric equipment, the electric equipment may be smart home equipment, and the mobile terminal may control starting, switching-off, running mode and the like of the electric equipment.

As another way of determining whether the electric equipment is in the working state is by detecting the current value of the smart socket. For example, the electric equipment may be determined to be in the working state when a current value in the smart socket is detected to be higher than a set current threshold value.

It should be understood that there are many manners for determining whether the electric equipment is in the working state, which will not be elaborated herein one by one.

For a manner for acquiring the temperature, the temperature in the smart socket may be acquired from a temperature sensor in the smart socket. In this case, the temperature detected by the temperature sensor in the smart socket is acquired. Here, the temperature sensor may be arranged on a circuit board of the smart socket. Alternatively or additionally, the temperature sensor may be arranged on an inner shell and the like of the smart socket.

When a plurality sensors are arranged in the smart socket, one of the plurality of sensors may measure the ambient temperature. In this case, the smart socket may use the temperature difference among the different sensors to determine whether the power of the connected electric equipment is abnormal. The smart socket may adjust the second threshold when the ambient temperature changes from a first preset range to a second preset range. For example, when the ambient temperature is between 15° and 20°, the second threshold may be 5°. When the ambient temperature is between 20° and 25°, the second threshold may be 6°. When the ambient temperature is between 25° and 30°, the second threshold may be 6.5°. Additionally or alternatively, the second threshold may be a fixed percentage of the average ambient temperature in a predetermined period of time such as 2 hours, 4 hours, 6 hours, 8 hours, etc. When the average temperature of the ambient temperature in the last four hours is 20°, the second threshold may be set as 6°, which is 30% of the average temperature.

Furthermore, the temperature sensor may be a built-in sensor of a micro-controller of the smart socket. Since the temperature is directly acquired from the temperature sensor in the micro-controller without additionally arranging a temperature sensor in the smart socket, cost may be reduced.

Step 202: the temperature in the smart socket is compared with a preset temperature threshold value, and it is determined whether power of electric equipment connected with the smart socket is higher than an upper limit of an acceptable power range of the smart socket according to a comparison result.

Herein, the preset temperature threshold value may be a preset threshold value configured to determine whether the power of the electric equipment is higher than the upper limit of the acceptable power range of the smart socket.

As a comparison means, whether the temperature in the smart socket is more than or equal to the preset temperature threshold value may be determined. When the temperature in the smart socket is more than or equal to the preset temperature threshold value, the power of the electric equipment connected with the smart socket may be determined to be higher than the upper limit of the acceptable power range of the smart socket. When the temperature in the smart socket is lower than the preset temperature threshold value, the power of the electric equipment connected with the smart socket may be determined not to be higher than the upper limit of the acceptable power range of the smart socket.

In this disclosure, the temperature in the smart socket is compared with the preset temperature threshold value, the power of the electric equipment connected with the smart socket may be determined to be higher than the upper limit of the acceptable power range of the smart socket when the temperature in the smart socket is more than or equal to the preset temperature threshold value. Thus, a power metering device may not be required to be arranged in the smart socket, so that cost for power determination is reduced.

Step 203: when the power of the electric equipment is determined to be higher than the upper limit of the acceptable power range of the smart socket, alarming information indicating that the power of the electric equipment is excessively high is generated.

Since the condition that the power of the electric equipment is higher than the upper limit of the acceptable power range of the smart socket is likely to cause a dangerous accident, the alarming information indicating that the power of the electric equipment is excessively high may be generated to prompt a user to check the electric equipment according to the event that the power of the electric equipment is higher than the upper limit of the acceptable power range of the smart socket when the power of the electric equipment is determined to be higher than the upper limit of the acceptable power range of the smart socket.

Since the electric equipment may still work normally and an obvious dangerous accident may not happen temporally when the power of the electric equipment is higher than the upper limit of the acceptable power range of the smart socket, so that the user may usually be unconscious, and huge loss may be caused as time goes on. While in the embodiment, the alarming information indicating that the power of the electric equipment is excessively high is generated to prompt the user and make the user know an alarming reason and directly check whether the power of the electric equipment is higher than the upper limit of the acceptable power range of the smart socket to avoid the phenomenon that the user who does not know the alarming reason only performs simple checking and omits checking and timely treatment of a real hidden danger to probably cause huge loss.

Step 204: the alarming information is pushed to a mobile terminal bound with the smart socket.

In the one or more embodiments of the present disclosure, the alarming information may be pushed to the mobile terminal bound with the smart socket to remotely give a prompt, and then the user having the mobile terminal may timely check the smart socket and the electric equipment to avoid loss. When a plurality of sensors are arranged in the smart socket, the smart socket may push the alarming information to the mobile terminal when a different between the temperature and the ambient temperature is greater than or equal to a second threshold.

Furthermore, when the information prompting method of the embodiment is applied to the server or smart socket in the application scenario shown in FIG. 1B, remote prompt may be implemented, and it is possible to avoid potential safety hazards caused by the excessively high power of the electric equipment after the user remotely controls the smart socket to switch on.

According to the one or more embodiments of the present disclosure, the temperature in the smart socket is acquired, the temperature in the smart socket is compared with the preset temperature threshold value. It is determined whether the power of the electric equipment connected with the smart socket is higher than the upper limit of the acceptable power range of the smart socket according to the comparison result, and the power metering device is not required to be a smart socket, so that the power determination cost is reduced. Then, the alarming information indicating that the power of the electric equipment is excessively high is generated when the power of the electric equipment is determined to be higher than the upper limit of the acceptable power range of the smart socket. The alarming information may be pushed to the mobile terminal bound with the smart socket. In this way, a user is remotely prompted, so that it is possible to avoid the potential safety hazards caused by the excessively high power of the electric equipment, and avoid service life of the smart socket to be shortened due to the excessively high power of the electric equipment.

Figure 3:
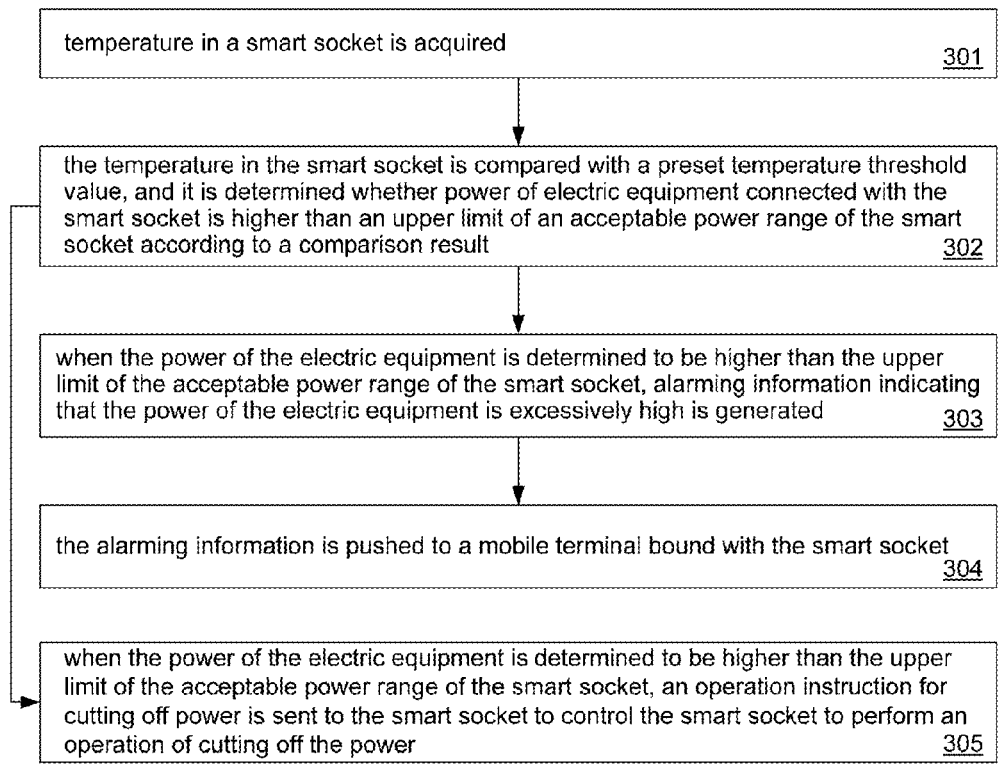
FIG. 3 is a flow chart showing another information prompting method according to an exemplary embodiment of the present disclosure.

FIG. 3 is a flow chart showing an information prompting method, according to an exemplary embodiment of the present disclosure, and as shown in FIG. 3, the method includes the following steps:

Step 301: temperature in a smart socket is acquired;

Step 302: the temperature in the smart socket is compared with a preset temperature threshold value, and it is determined whether power of electric equipment connected with the smart socket is higher than an upper limit of an acceptable power range of the smart socket according to a comparison result;

Step 303: when the power of the electric equipment is determined to be higher than the upper limit of the acceptable power range of the smart socket, alarming information indicating that the power of the electric equipment is excessively high is generated;

Step 304: the alarming information is pushed to a mobile terminal bound with the smart socket; and Step 305: when the power of the electric equipment is determined to be higher than the upper limit of the acceptable power range of the smart socket, an operation instruction for cutting off power is sent to the smart socket to control the smart socket to perform operation of cutting off the power.

Herein, related technologies for Step 301 to Step 304 and Step 201 to Step 204 are the same, and will not be elaborated herein one by one.

In Step 305, when the power of the electric equipment is determined to be higher than the upper limit of the acceptable power range of the smart socket, the operation instruction for cutting off the power may be sent to the smart socket to control the smart socket to perform the operation of cutting off the power to timely avoid occurrence of a danger.

According to the one or more embodiments of the present disclosure, the temperature in the smart socket is acquired, the temperature in the smart socket is compared with the preset temperature threshold value, it is determined whether the power of the electric equipment connected with the smart socket is higher than the upper limit of the acceptable power range of the smart socket according to the comparison result, the alarming information indicating that the power of the electric equipment is excessively high is generated when the power of the electric equipment is determined to be higher than the upper limit of the acceptable power range of the smart socket. The alarming information may be pushed to the mobile terminal bound with the smart socket to remotely prompt a user to check the electric equipment to overcome the shortcomings of potential safety hazards and shortening of service life of the smart socket due to the excessively high power of the electric equipment; and in addition, the operation instruction for cutting off the power is sent to the smart socket to timely control the smart socket to perform the operation of cutting off the power, so that loss caused by the excessively high power is avoided.

Various technical features in the abovementioned implementation modes may be freely combined as long as there are no contradictions or conflicts among combinations of the features, which are not described one by one due to space limitations, so that any combination of various technical features in the abovementioned implementation modes also fall within the scope of the present disclosure.

Corresponding to the abovementioned embodiments regarding the information prompting method, the present disclosure further provides embodiments regarding an information prompting device and a terminal applied by it.

Figure 4:
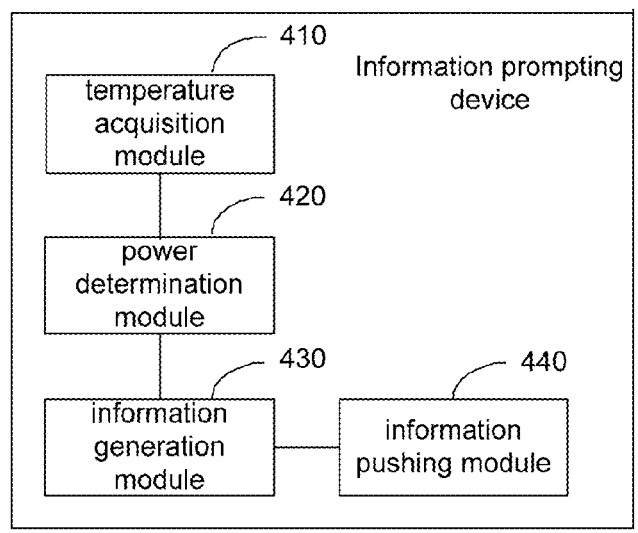
FIG. 4 is a block diagram of an information prompting device according to an exemplary embodiment of the present disclosure.

FIG. 4 is a block diagram of a device for prompting information, according to an exemplary embodiment of the present disclosure. As shown in FIG. 4, the device may include: a temperature acquisition module 410, a power determination module 420, an information generation module 430, and an information pushing module 440.

Herein, the temperature acquisition module 410 is configured to acquire temperature in a smart socket. The power determination module 420 is configured to compare the temperature in the smart socket with a preset temperature threshold value, and determine whether power of electric equipment connected with the smart socket is higher than an upper limit of an acceptable power range of the smart socket according to a comparison result. The information generation module 430 is configured to, when the power of the electric equipment is determined to be higher than the upper limit of the acceptable power range of the smart socket, generate alarming information indicating that the power of the electric equipment is excessively high. The information pushing module 440 is configured to push the alarming information to a mobile terminal bound with the smart socket.

According to the one or more embodiments, the temperature in the smart socket is acquired, the temperature in the smart socket is compared with the preset temperature threshold value. It is determined whether the power of the electric equipment connected with the smart socket is higher than the upper limit of the acceptable power range of the smart socket according to the comparison result, the alarming information indicating that the power of the electric equipment is excessively high is generated when the power of the electric equipment is determined to be higher than the upper limit of the acceptable power range of the smart socket. The alarming information may be pushed to the mobile terminal bound with the smart socket. A user is prompted to check the electric equipment, so that it is possible to avoid potential safety hazards caused by the excessively high power of the electric equipment, and avoid service life of the smart socket to be shortened due to the excessively high power of the electric equipment.

In the disclosure, the device may be implemented by one or more circuitries, which include application specific integrated circuits (ASIC), digital signal processors (DSP), digital signal processor devices (DSPD), programmable logic devices (PLD), field programmable gate arrays (FPGA), controllers, micro controllers, microprocessors, or other electronic elements. The device may use the circuitries in combination with the other hardware or software components for executing the method above. Each module, submodule, unit, or sub-unit disclosed above may be implemented at least partially using the one or more circuitries.

Figure 5:
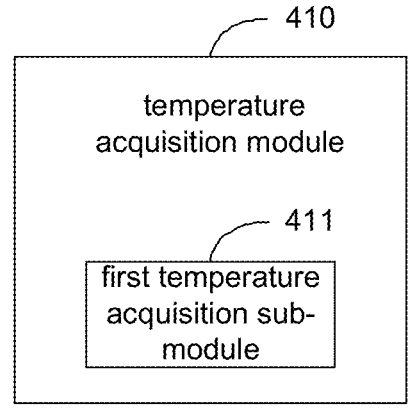
FIG. 5 is a block diagram of another information prompting device according to an exemplary embodiment of the present disclosure.

FIG. 5 is a block diagram of another information prompting device, according to an exemplary embodiment of the present disclosure, and as shown in FIG. 5, based on the embodiment shown in FIG. 4, the temperature acquisition module 410 in the embodiment includes: a first temperature acquisition sub-module 411.

Herein, the first temperature acquisition sub-module 411 is configured to acquire the temperature in the smart socket from a temperature sensor in the smart socket.

According to the one or more embodiments, the temperature in the smart socket may be acquired from the temperature sensor in the smart socket, so that easiness for implementation is ensured.

Figure 6:
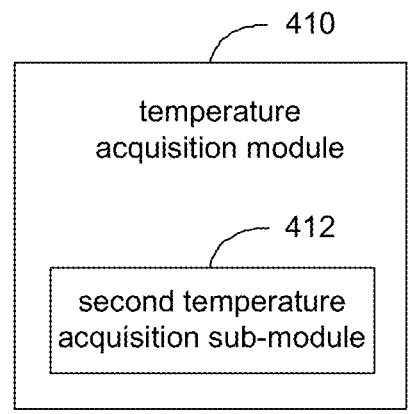
FIG. 6 is a block diagram of another information prompting device according to an exemplary embodiment of the present disclosure.

FIG. 6 is a block diagram of another information prompting device, according to an exemplary embodiment of the present disclosure, and as shown in FIG. 6, based on the embodiment shown in FIG. 4, the temperature acquisition module 410 in the embodiment includes: a second temperature acquisition sub-module 412.

Herein, the second temperature acquisition sub-module 412 is configured to acquire the temperature in the smart socket during working of the electric equipment, the electric equipment being connected with the smart socket.

According to the one or more embodiments, only the temperature in the smart socket during working of the electric equipment is acquired, so that resource waste caused by acquisition and comparison may be avoided.

Figure 7:
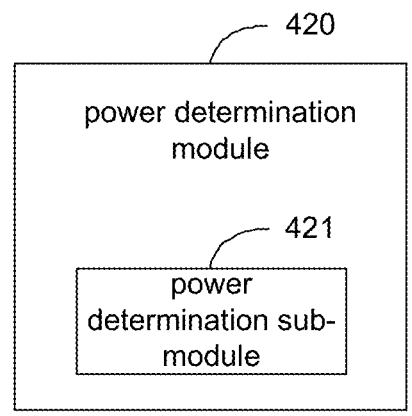
FIG. 7 is a block diagram of another information prompting device according to an exemplary embodiment of the present disclosure.

FIG. 7 is a block diagram of an information prompting device, according to an exemplary embodiment of the present disclosure, and as shown in FIG. 7, based on the embodiment shown in FIG. 4, the power determination module 420 in the embodiment includes: a power determination sub-module 421.

Herein, the power determination sub-module 421 is configured to, when the temperature in the smart socket is more than or equal to the preset temperature threshold value, determine that the power of the electric equipment connected with the smart socket is higher than the upper limit of the acceptable power range of the smart socket.

According to the one or more embodiments, the temperature in the smart socket is compared with the preset temperature threshold value, the power of the electric equipment connected with the smart socket may be determined to be higher than the upper limit of the acceptable power range of the smart socket when the temperature in the smart socket is more than or equal to the preset temperature threshold value, thus a power metering device is not required to be arranged in the smart socket, so that cost for power determination is reduced.

Figure 8:
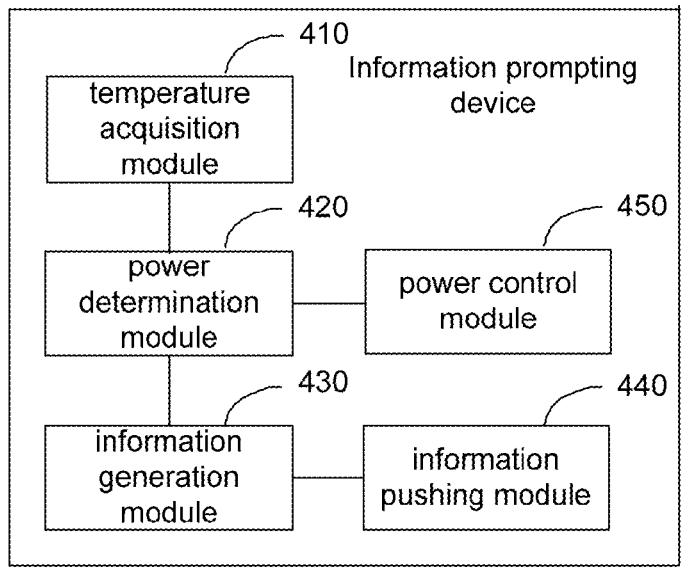
FIG. 8 is a block diagram of another information prompting device according to an exemplary embodiment of the present disclosure.

FIG. 8 is a block diagram of another example device for prompting information, according to an exemplary embodiment of the present disclosure. As shown in FIG. 8, based on the embodiments shown in any one of FIG. 4 to FIG. 7, the device in the embodiment further includes: a power control module 450.

Herein, the power control module 450 is configured to, when the power of the electric equipment is determined to be higher than the upper limit of the acceptable power range of the smart socket, send an operation instruction for cutting off power to the smart socket to control the smart socket to perform operation of cutting off the power.

According to the one or more embodiments, when the power of the electric equipment is determined to be higher than the upper limit of the acceptable power range of the smart socket, not only the alarming information indicating that the power of the electric equipment is excessively high is generated, but also the alarming information is pushed to the mobile terminal bound with the smart socket, and in addition, the operation instruction for cutting off the power is sent to the smart socket to timely control the smart socket to perform the operation of cutting off the power, so that the user is prompted to check the electric equipment, thus it is possible to overcome the shortcomings of potential safety hazards and shortening of the service life of the smart socket due to the excessively high power of the electric equipment, and in addition, loss caused by the excessively high power is avoided.

Correspondingly, the present disclosure further provides an information prompting device, and the device includes a processor; and a memory for storing instructions executable by the processor. The processor is configured to: acquire temperature in a smart socket; compare the temperature in the smart socket with a preset temperature threshold value, and determine whether power of electric equipment connected with the smart socket is higher than an upper limit of an acceptable power range of the smart socket according to a comparison result. When the power of the electric equipment is determined to be higher than the upper limit of the acceptable power range of the smart socket, the processor is configured to generate alarming information indicating that the power of the electric equipment is excessively high. The device may push the alarming information to a mobile terminal bound with the smart socket.

Specific details about realization processes of functions and effects of each module in the abovementioned devices refer to implementation processes of the corresponding steps in the abovementioned methods, and will not be elaborated herein.

Since the device embodiments substantially correspond to the method embodiments, related parts refer to part of descriptions in the method embodiments. The device embodiments described above are only schematic, in which the modules described as separate parts may or may not be physically separated and the parts displayed as modules may or may not be physical modules and namely may be located in the same place or distributed to multiple network modules. The purpose of the solutions of the present disclosure may be achieved by selecting part or all of the modules according to a practical requirement, which may be understood and implemented by those skilled in the art without any creative work.

Figure 9:
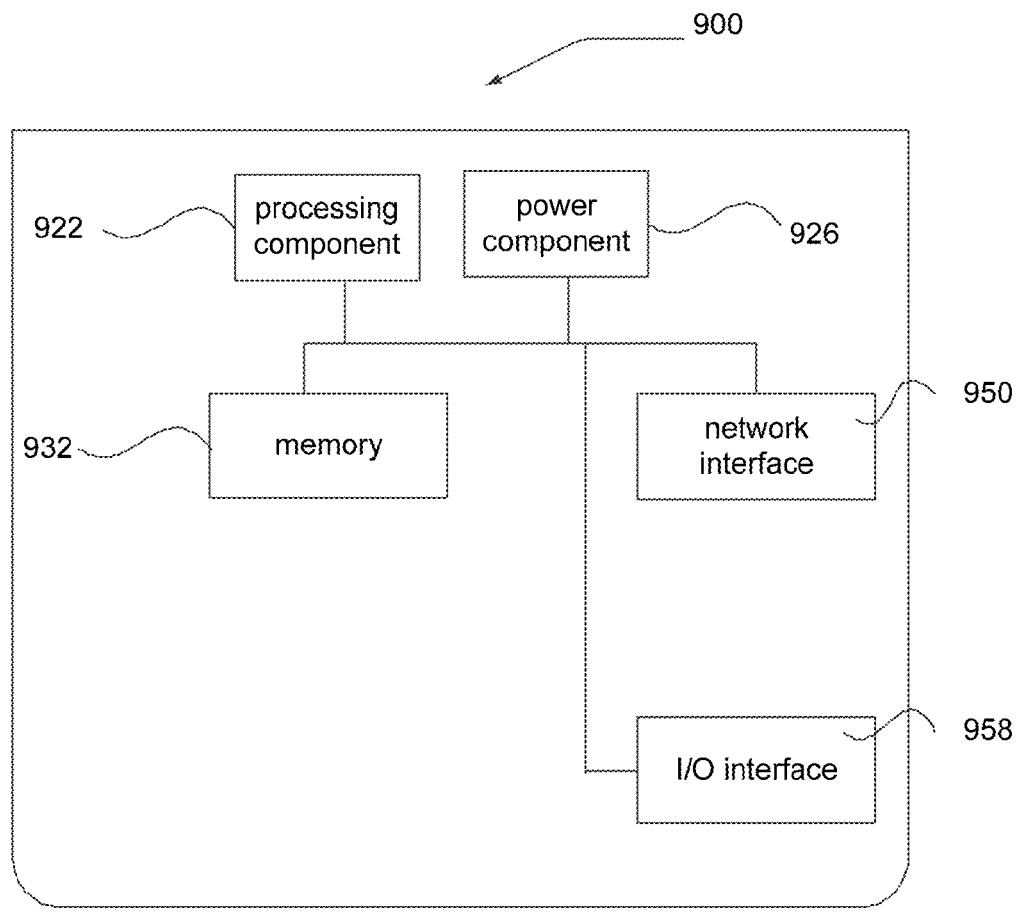
FIG. 9 is a block diagram of an information prompting device according to an exemplary embodiment of the present disclosure.

As shown in FIG. 9, FIG. 9 is a block diagram of an information prompting device 900, according to an exemplary embodiment. For example, the device 900 may be provided as a server. Referring to FIG. 9, the device 900 includes a processing component 922, which further includes one or more processors and a memory resource represented by a memory 932 for storing instructions, such as applications, executable by the processing component 922. The applications stored in the memory 932 may include one or more than one module of which each corresponds to a set of instructions. In addition, the processing component 922 is configured to execute the instructions to implement the abovementioned information prompting method.

The device 900 may further include a power component 926 configured to perform power management of the device 900, a wired or wireless network interface 950 configured to connect the device 900 to a network, and an Input/Output (I/O) interface 958. The device 900 may be operated on the basis of an operating system stored in the memory 1932, such as Windows Server™, Mac OS X™, Unix™, Linux™ or FreeBSD™.

Here, the device 900 may be implemented by one or more circuitries, which include application specific integrated circuits (ASIC), digital signal processors (DSP), digital signal processor devices (DSPD), programmable logic devices (PLD), field programmable gate arrays (FPGA), controllers, micro controllers, microprocessors, or other electronic elements. The device may use the circuitries in combination with the other hardware or software components for executing the method above. Each module, sub-module, unit, or sub-unit disclosed above may be implemented at least partially using the one or more circuitries.

Other embodiments of the present disclosure will be apparent to those skilled in the art from consideration of the specification and practice of the present disclosure disclosed here. This application is intended to cover any variations, uses, or adaptations of the present disclosure following the general principles thereof and including such departures from the present disclosure as come within known or customary practice in the art. It is intended that the specification and examples be considered as exemplary only, with a true scope and spirit of the present disclosure being indicated by the following claims.

It will be appreciated that the present disclosure is not limited to the exact construction that has been described above and illustrated in the accompanying drawings, and that various modifications and changes may be made without departing from the scope thereof. It is intended that the scope of the present disclosure only be limited by the appended claims.

The above is only the preferred embodiment of the present disclosure and not intended to limit the present disclosure. Any modifications, equivalent replacements, improvements and the like made within the spirit and principle of the present disclosure shall fall within the scope of protection of the present disclosure.

According to the present disclosure, the temperature in the smart socket is acquired, the temperature in the smart socket is compared with the preset temperature threshold value. It is determined whether the power of the electric equipment connected with the smart socket is higher than the upper limit of the acceptable power range of the smart socket according to the comparison result. The alarming information indicating that the power of the electric equipment is excessively high is generated when the power of the electric equipment is determined to be higher than the upper limit of the acceptable power range of the smart socket. The alarming information may be pushed to the mobile terminal bound with the smart socket. In this way, a user is prompted to check the electric equipment, so that it is possible to avoid potential safety hazards caused by the excessively high power of the electric equipment, and avoid service life of the smart socket to be shortened due to the excessively high power of the electric equipment. In addition, the alarming information is pushed to the mobile terminal, so that a prompt may be remotely given.

According to the present disclosure, the temperature in the smart socket may be acquired from the temperature sensor in the smart socket, so that easiness for implementation is ensured.

According to the present disclosure, the temperature in the smart socket during working of the electric equipment may be acquired, the electric equipment is connected with the smart socket, and since only the temperature in the smart socket during working of the electric equipment is acquired, resource waste caused by real-time acquisition and comparison may be avoided.

According to the present disclosure, the temperature in the smart socket is compared with the preset temperature threshold value, the power of the electric equipment connected with the smart socket may be determined to be higher than the upper limit of the acceptable power range of the smart socket when the temperature in the smart socket is more than or equal to the preset temperature threshold value, thus a power metering device is not required to be arranged in the smart socket, so that cost for power determination is reduced.

According to the present disclosure, when the power of the electric equipment is determined to be higher than the upper limit of the acceptable power range of the smart socket, not only the alarming information indicating that the power of the electric equipment is excessively high is generated, but also the alarming information is pushed to the mobile terminal bound with the smart socket, and in addition, the operation instruction for cutting off the power is sent to the smart socket to timely control the smart socket to perform the operation of cutting off the power, so that the user is prompted to check the electric equipment, thus it is possible to overcome the shortcomings of potential safety hazards and shortening of the service life of the smart socket due to the excessively high power of the electric equipment, and in addition, loss caused by the excessively high power is avoided.

What is claimed is:

1. A method, comprising:
   acquiring temperature in a smart socket measured by a built-in sensor of a micro-controller in the smart socket;
   comparing the temperature in the smart socket with a preset temperature threshold value, and determining whether power of electric equipment connected with the smart socket is higher than an upper limit of an acceptable power range of the smart socket according to a comparison result, wherein the preset temperature threshold value is a preset threshold value configured to determine whether the power of the electric equipment is higher than the upper limit of the acceptable power range of the smart socket;
   when the power of the electric equipment is determined to be higher than the upper limit of the acceptable power range of the smart socket, generating alarming information indicating that the power of the electric equipment is excessively high; and
   pushing the alarming information to a mobile terminal bound with the smart socket;
   wherein comparing the temperature in the smart socket with the preset temperature threshold value and determining whether the power of the electric equipment connected with the smart socket is higher than the upper limit of the acceptable power range of the smart socket according to the comparison result comprises:
   when the temperature measured by the built-in sensor of the micro-controller is more than or equal to the preset temperature threshold value, determining that the power of the electric equipment connected with the smart socket is higher than the upper limit of the acceptable power range of the smart socket.

2. The method according to claim 1, wherein acquiring the temperature in the smart socket comprises:
   acquiring the temperature in the smart socket from a temperature sensor in the smart socket.

3. The method according to claim 1, wherein acquiring the temperature in the smart socket comprises:
   acquiring the temperature in the smart socket during working of the electric equipment, the electric equipment being connected with the smart socket.

4. The method according to claim 1, further comprising:
when the power of the electric equipment is determined to be higher than the upper limit of the acceptable power range of the smart socket, sending an operation instruction for cutting off power to the smart socket to control the smart socket to perform an operation of cutting off the power.

5. The method according to claim 1, further comprising:
measuring an ambient temperature where the smart socket operates.

6. The method according to claim 5, further comprising:
pushing the alarming information to the mobile terminal when a different between the temperature and the ambient temperature is greater than or equal to a second threshold.

7. The method according to claim 6, further comprising:
adjusting the second threshold when the ambient temperature changes from a first preset range to a second preset range.

8. A device, comprising:
a processor; and
a memory for storing instructions executable by the processor,
wherein the processor is configured to:
acquire temperature in a smart socket measured by a built-in sensor of the processor in the smart socket;
compare the temperature in the smart socket with a preset temperature threshold value, and determine whether power of electric equipment connected with the smart socket is higher than an upper limit of an acceptable power range of the smart socket according to a comparison result, wherein the preset temperature threshold value is a preset threshold value configured to determine whether the power of the electric equipment is higher than the upper limit of the acceptable power range of the smart socket;
when the power of the electric equipment is determined to be higher than the upper limit of the acceptable power range of the smart socket, generate alarming information indicating that the power of the electric equipment is excessively high; and
push the alarming information to a mobile terminal bound with the smart socket;
wherein comparing the temperature in the smart socket with the preset temperature threshold value and determining whether the power of the electric equipment connected with the smart socket is higher than the upper limit of the acceptable power range of the smart socket according to the comparison result comprises:
when the temperature measured by the built-in sensor of the processor is more than or equal to the preset temperature threshold value, determining that the power of the electric equipment connected with the smart socket is higher than the upper limit of the acceptable power range of the smart socket.

9. The device according to claim 8, wherein in order to acquire the temperature in the smart socket, the processor is configured to:
acquire the temperature in the smart socket from a temperature sensor in the smart socket.

10. The device according to claim 8, wherein in order to acquire the temperature in the smart socket, the processor is configured to:
acquire the temperature in the smart socket during working of the electric equipment, the electric equipment being connected with the smart socket.

11. The device according to claim 8, wherein the processor is further configured to:
when the power of the electric equipment is determined to be higher than the upper limit of the acceptable power range of the smart socket, send an operation instruction for cutting off power to the smart socket to control the smart socket to perform an operation of cutting off the power.

12. The device according to claim 9, wherein the processor is further configured to:
when the power of the electric equipment is determined to be higher than the upper limit of the acceptable power range of the smart socket, send an operation instruction for cutting off power to the smart socket to control the smart socket to perform an operation of cutting off the power.

13. The device according to claim 10, wherein the processor is further configured to:
when the power of the electric equipment is determined to be higher than the upper limit of the acceptable power range of the smart socket, send an operation instruction for cutting off power to the smart socket to control the smart socket to perform an operation of cutting off the power.

14. A non-transitory computer-readable storage medium having stored therein instructions that, when executed by a processor, causes the processor to perform an information prompting method, the method comprising:
acquiring temperature in a smart socket measured by a built-in sensor of the processor in the smart socket;
comparing the temperature in the smart socket with a preset temperature threshold value, and determining whether power of electric equipment connected with the smart socket is higher than an upper limit of an acceptable power range of the smart socket according to a comparison result, wherein the preset temperature threshold value is a preset threshold value configured to determine whether the power of the electric equipment is higher than the upper limit of the acceptable power range of the smart socket;
when the power of the electric equipment is determined to be higher than the upper limit of the acceptable power range of the smart socket, generating alarming information indicating that the power of the electric equipment is excessively high; and
pushing the alarming information to a mobile terminal bound with the smart socket;
wherein comparing the temperature in the smart socket with the preset temperature threshold value and determining whether the power of the electric equipment connected with the smart socket is higher than the upper limit of the acceptable power range of the smart socket according to the comparison result comprises:
when the temperature measured by the built-in sensor of the processor is more than or equal to the preset temperature threshold value, determining that the power of the electric equipment connected with the smart socket is higher than the upper limit of the acceptable power range of the smart socket.

15. The non-transitory computer-readable storage medium according to claim 14, wherein acquiring the temperature in the smart socket comprises:
acquiring the temperature in the smart socket from a temperature sensor in the smart socket.

16. The non-transitory computer-readable storage medium according to claim 14, wherein acquiring the temperature in the smart socket comprises:

acquiring the temperature in the smart socket during working of the electric equipment, the electric equipment being connected with the smart socket.

17. The non-transitory computer-readable storage medium according to claim 14, wherein the method further comprises:
when the power of the electric equipment is determined to be higher than the upper limit of the acceptable power range of the smart socket, sending an operation instruction for cutting off power to the smart socket to control the smart socket to perform an operation of cutting off the power.

* * * * *